(12) United States Patent
Bingham et al.

(10) Patent No.: US 6,842,406 B2
(45) Date of Patent: Jan. 11, 2005

(54) HOUSING FOR INFORMATION STORAGE MEDIUM AND APPARATUS TO MOVE SAME

(75) Inventors: Robert L. Bingham, Vail, AZ (US); Kamal E. Dimitri, Tucson, AZ (US); Jerry W. Hammar, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 10/158,758

(22) Filed: May 30, 2002

(65) Prior Publication Data

US 2003/0223324 A1 Dec. 4, 2003

(51) Int. Cl.⁷ .............................................. G11B 15/68
(52) U.S. Cl. ..................................... 369/30.43; 360/92
(58) Field of Search .......................... 369/30.43, 30.45; 360/92; 242/337.1, 337

(56) References Cited

U.S. PATENT DOCUMENTS

| | | | |
|---|---|---|---|
| 3,127,179 A | * 3/1964 | Osborne et al. ........... 360/74.3 |
| 3,999,219 A | 12/1976 | Andrews ...................... 360/92 |
| 5,021,902 A | 6/1991 | Ishikawa et al. .............. 360/92 |
| 5,099,465 A | 3/1992 | Geiger et al. ................. 369/36 |
| 5,228,636 A | 7/1993 | Tanaka ........................ 242/199 |
| 5,673,155 A | 9/1997 | Motoyama et al. ........... 360/92 |

\* cited by examiner

*Primary Examiner*—Angel Castro
(74) *Attorney, Agent, or Firm*—Dale F. Regelman

(57) ABSTRACT

A housing for an information storage medium where at least one surface of that housing includes a plurality of grooves. A locomotion apparatus to move Applicants' housing within an information storage and retrieval system, where that apparatus includes at least one rotatable shaft and at least one drive member disposed on that shaft, where each such drive member has the shape of a truncated cone, and where each such drive member includes a drive surface which includes a plurality of ribs. Applicants' drive member contacts the grooved surface of Applicants' housing such that one or more of the ribs disposed on the drive surface intermeshes with one or more of the grooves in the housing. Rotation of the rotatable shaft in a first direction causes the housing the move in a second direction. Rotation of the rotatable shaft in a third direction causes the housing to move in a fourth direction.

30 Claims, 13 Drawing Sheets

FIG. 2
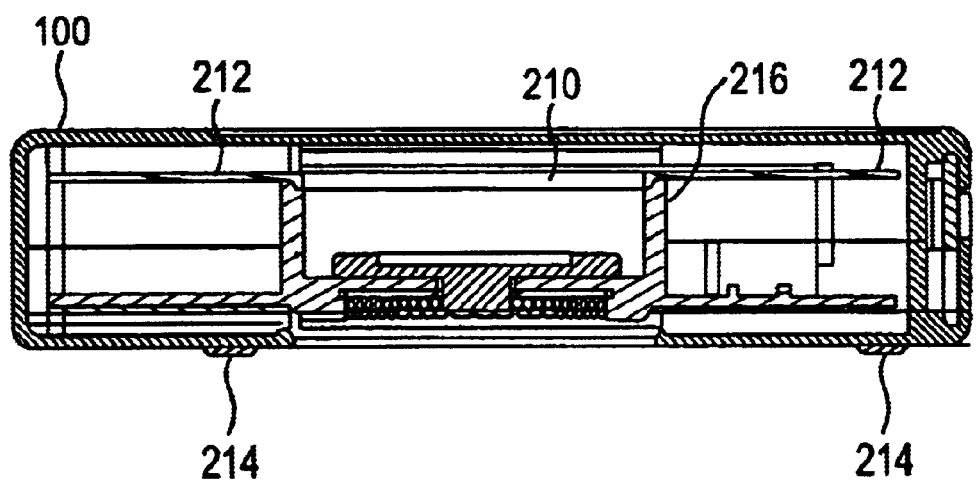
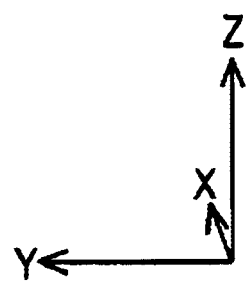

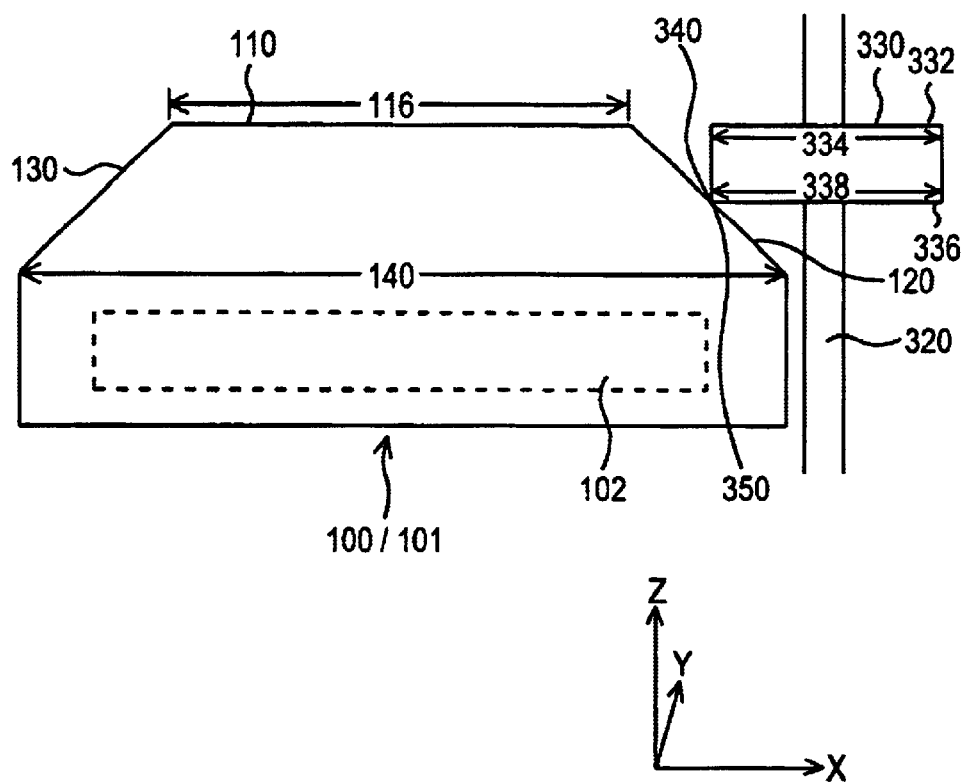

FIG. 3B
PRIOR ART
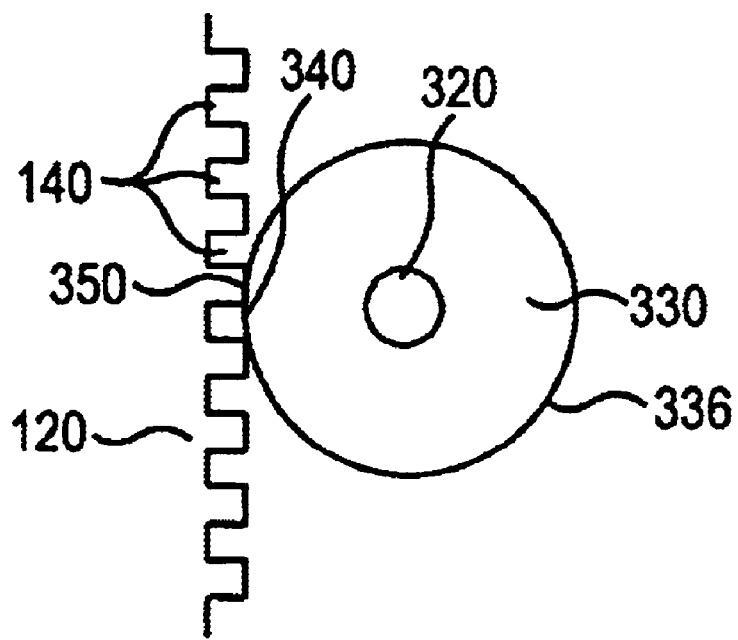
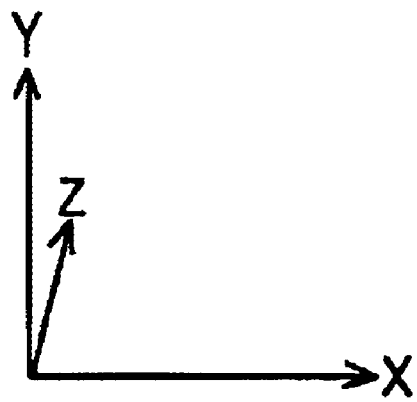

FIG. 4E
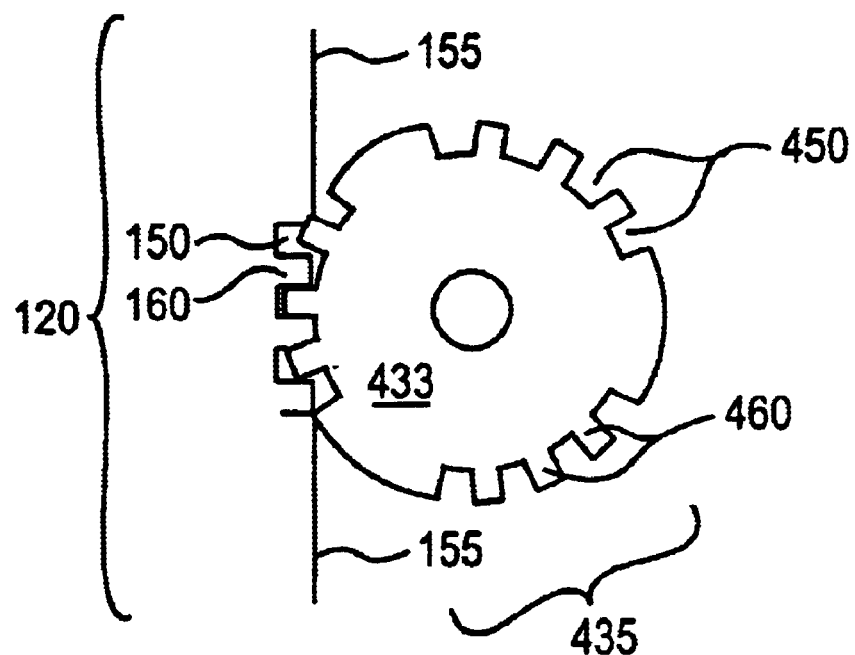
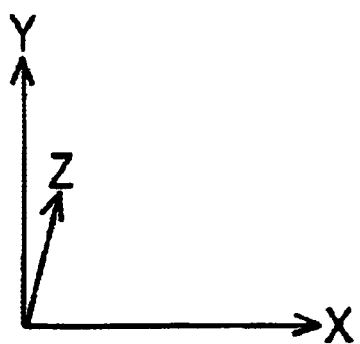

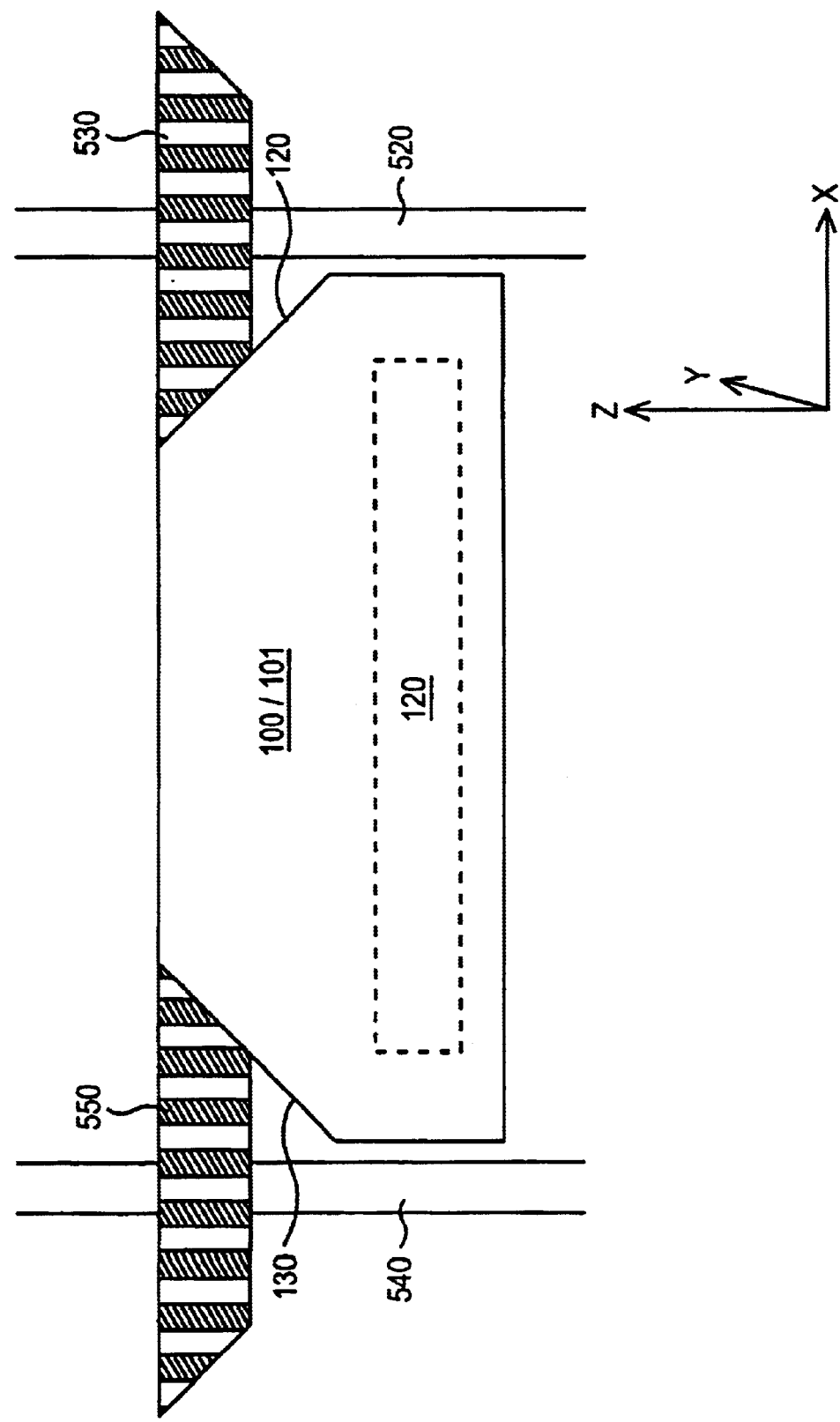

HOUSING FOR INFORMATION STORAGE MEDIUM AND APPARATUS TO MOVE SAME

FIELD OF THE INVENTION

This invention relates to the field of housings for information storage media. In certain embodiments, the invention relates to a tape storage cartridge. The invention further relates to an apparatus to move Applicants' housing into, and out of, cartridge magazines, data storage devices, robotic accessors, storage cells, input/output stations, and the like.

BACKGROUND OF THE INVENTION

Automated media storage libraries are known for providing cost effective access to large quantities of stored media. The typical portable information storage media is a tape cartridge, an optical cartridge, a disk cartridge, and the like. In certain libraries, one or more portable information storage cartridges are stored in one or more cartridge magazines disposed adjacent one or more data storage devices.

Other media storage libraries include a large number of storage slots on which are stored portable information storage media. One (or more) accessors retrieve the information storage media from the storage slots and deliver the accessed media to a information storage device for reading and/or writing data on the accessed media. Suitable electronics both operate the accessor and operate the information storage devices to transmit and/or receive data from an attached on-line host computer system.

Tape cartridges containing, for example, magnetic tape, are often used in automated data storage libraries. Tape media, such a magnetic tape, is a common medium for the storage of data to be utilized by a computer. Magnetic tape has found widespread use as a data storage medium because it provides a relatively inexpensive solution for storing large amounts of data. Magnetic tape is typically stored on cartridges of which there are a variety of different types and sizes. One reason for the variety of cartridge types is the variety of different tape drives in which the cartridges are used.

Tape cartridges are comprised essentially of a cartridge shell which houses a rotatably mounted reel. Magnetic tape is wound around the hub of the reel. Reel flanges are used to contain the magnetic tape as the magnetic tape is wound on the hub. A fully loaded tape cartridge has magnetic tape wound around the hub such that the multiple layers of tape form a stack of magnetic tape extending out to near the end of the reel flanges. The tape cartridge is inserted into a tape drive mechanism which automatically threads the magnetic tape from the tape cartridge through the tape guide mechanism of the tape drive assembly. The tape is then available to the tape drive mechanism for the reading and writing of data.

SUMMARY OF THE INVENTION

Applicants' invention includes an apparatus to move a portable information storage medium. Applicants' apparatus includes a housing for the information storage medium. Applicants' housing includes a first surface having a first edge and an opposing second edge separated by a first width. Applicants' housing further includes a second surface having a third edge an opposing fourth edge separated by a second width and a first plurality of grooves disposed between the third edge and the fourth edge, where the third edge is attached to the first edge. Applicants' housing further includes a third surface having a fifth edge and an opposing sixth edge separated by a third width, where the fifth edge is attached to the second edge. In certain embodiments, the second width substantially equals the third width. In certain embodiments, the fourth edge and the sixth edge are separated by a first distance, where that first distance is greater than the first width.

Applicants' apparatus further includes a rotatable shaft, and a drive member disposed around that rotatable shaft. Applicants' drive member includes a first side having a first diameter, an opposing second side having a second diameter, and a first drive surface connecting the first side and the second side, where the first diameter is greater than the second diameter. Applicants' drive surface has the shape of a truncated cone, and includes a plurality of ribs disposed between the first side and the second side. When Applicants' housing is positioned adjacent the rotatable shaft one or more of the plurality of ribs intermeshes with one or more of the plurality of grooves.

Applicants' invention includes a data storage and retrieval system which includes one or more information storage media individually disposed in one or more of Applicants' housings, and one or more devices which include one or more rotatable shafts in combination with one or more of Applicants' drive members. Such devices include one or more data storage devices, one or more cartridge magazines, one or more accessors, one or more import/export stations, and the like.

Applicants' invention further includes a method to move an information storage medium, where that information storage medium is disposed in Applicants' housing and where that housing is disposed in Applicants' apparatus. Applicants' method is useful for moving an information storage medium into, and/or out of, a data storage device, an accessor, a cartridge magazine, an import/export station, and the like.

BRIEF DESCRIPTION OF THE DRAWINGS

The invention will be better understood from a reading of the following detailed description taken in conjunction with the drawings in which like reference designators are used to designate like elements, and in which:

FIG. 2 shows a cross-sectional view of one embodiment of Applicants' housing;

FIG. 3A shows a perspective view of Applicants' housing disposed in a prior art locomotion apparatus;

FIG. 3B shows a top view of a portion of one surface of Applicants' housing and a portion of the prior art locomotion apparatus of FIG. 3A;

FIG. 4E shows a top view of a portion of one surface of the second embodiment of Applicants' housing and a portion of the third embodiment of Applicants' locomotion apparatus;

FIG. 5 shows a perspective view of Applicants' housing disposed in a fourth embodiment of Applicants' locomotion apparatus;

DETAILED DESCRIPTION OF THE PREFERRED EMBODIMENTS

Referring to the illustrations, like numerals correspond to like parts depicted in the figures. The invention will be described as embodied in a portable data storage cartridge in combination with an apparatus to move that cartridge within an information storage and retrieval system. The following description of Applicant's apparatus and method is not meant, however, to limit Applicant's invention to tape cartridges or to data processing applications, as the invention herein can be applied generally to housings for information storage media, an apparatus to move that housing, and a method using Applicants' housing and apparatus.

Data storage and retrieval systems include one or more portable information storage media. Such information storage media include, for example, magnetic information storage media, optical information storage media, electronic information storage media, and the like. By electronic storage media, Applicants mean a device such as a PROM, EPROM, EEPROM, Flash PROM, compactflash, smartmedia, and the like. These one or more portable information storage media are individually disposed in one or more housings. Such a portable information storage medium/portable housing combination is sometimes referred to as a information storage cartridge.

To load/unload one or more information storage cartridges into one or more data storage devices for information transfer, certain data storage and retrieval systems include one or more cartridge changers disposed adjacent those one or more data storage devices. Such cartridge changers, sometimes called cartridge magazines, comprise storage slots for one or more portable information storage cartridges. Portable information storage cartridges are individually moved from such a cartridge magazine into, for example, a data storage device where information is written to, and or read from, the information storage medium disposed within the information storage cartridge.

Figure 6:
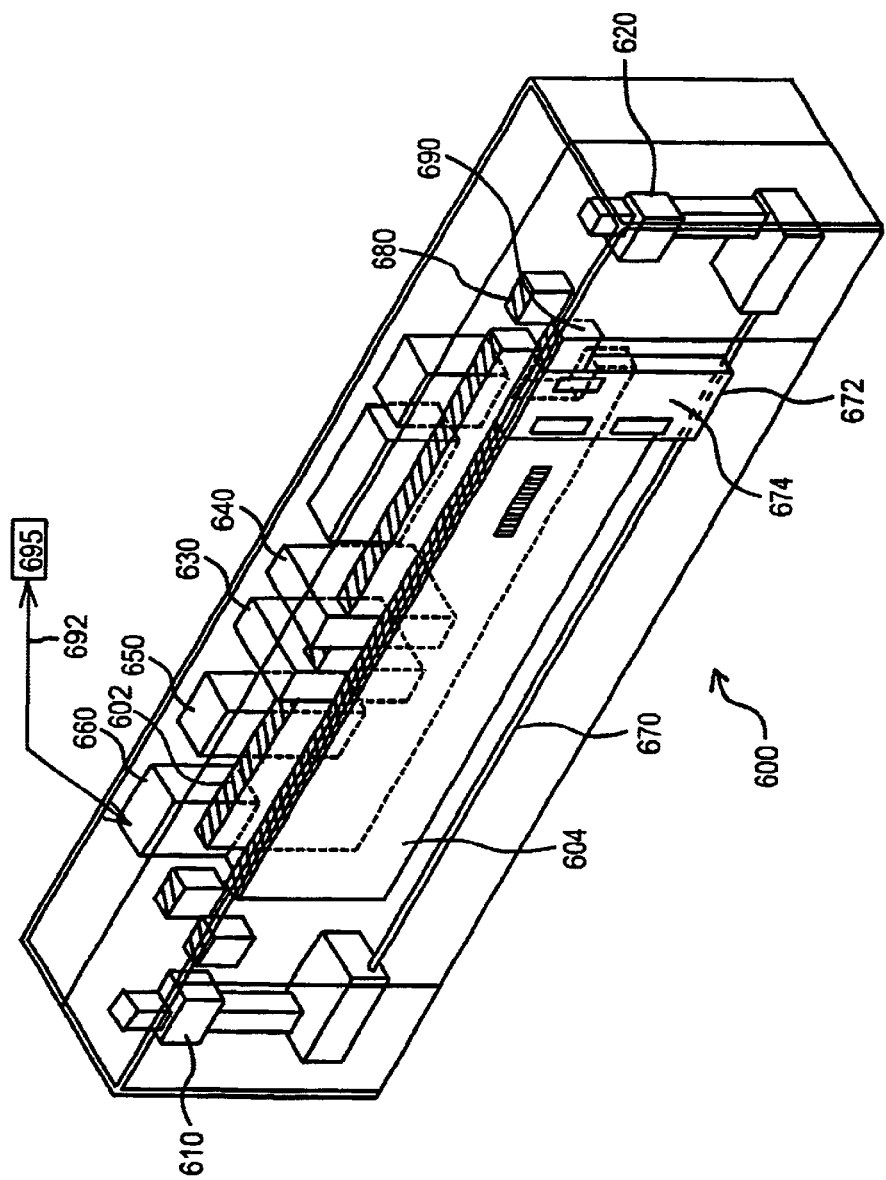
FIG. 6 shows a perspective view of a first embodiment of Applicants' data storage and retrieval system.

Certain data storage and retrieval systems include a plurality of storage slots in which are stored one or more information storage cartridges in combination with one or more robotic accessors to transport those portable information storage cartridges to one or more data storage devices. Referring now to FIG. 6, data storage and retrieval system 600 communicates with one or more host computers, such as host computer 695, via one or more communication links, such as communication link 692. Data storage and retrieval system 600 includes first wall of storage slots 602 and second wall of storage slots 604. Portable data storage media are individually stored in these storage slots. Such data storage media are individually housed in portable housings, i.e. Applicants' housing 100/101 (FIG. 1A)/101 (FIG. 1B). Examples of such data storage media include magnetic tapes, magnetic disks of various types, optical disks of various types, electronic storage media, and the like.

Applicant's automated data storage and retrieval system includes one or more accessors, such as accessors 610 and 620. An accessor is a robotic device which retrieves the portable data storage cartridges from first storage wall 602 or second storage wall 604, transports those accessed cartridges to input output devices 630/640 for reading and/or writing data thereon, and returns the cartridges to proper storage slots.

In certain embodiments, device 660 comprises a library controller. In certain of these embodiments, library controller 660 is integral with a computer. Operator input station 650 permits a user to communicate with Applicant's automated data storage and retrieval system 600. Power component 680 and power component 690 each comprise one or more power supply units which supply power to the individual components disposed within Applicant's automated data storage and retrieval system. Import/export station 672 includes access door 674 pivotably attached to the side of system 600. Portable data storage cartridges can be placed in the system, or in the alternative, removed from the system, via station 672 and access door 674.

Figure 7:
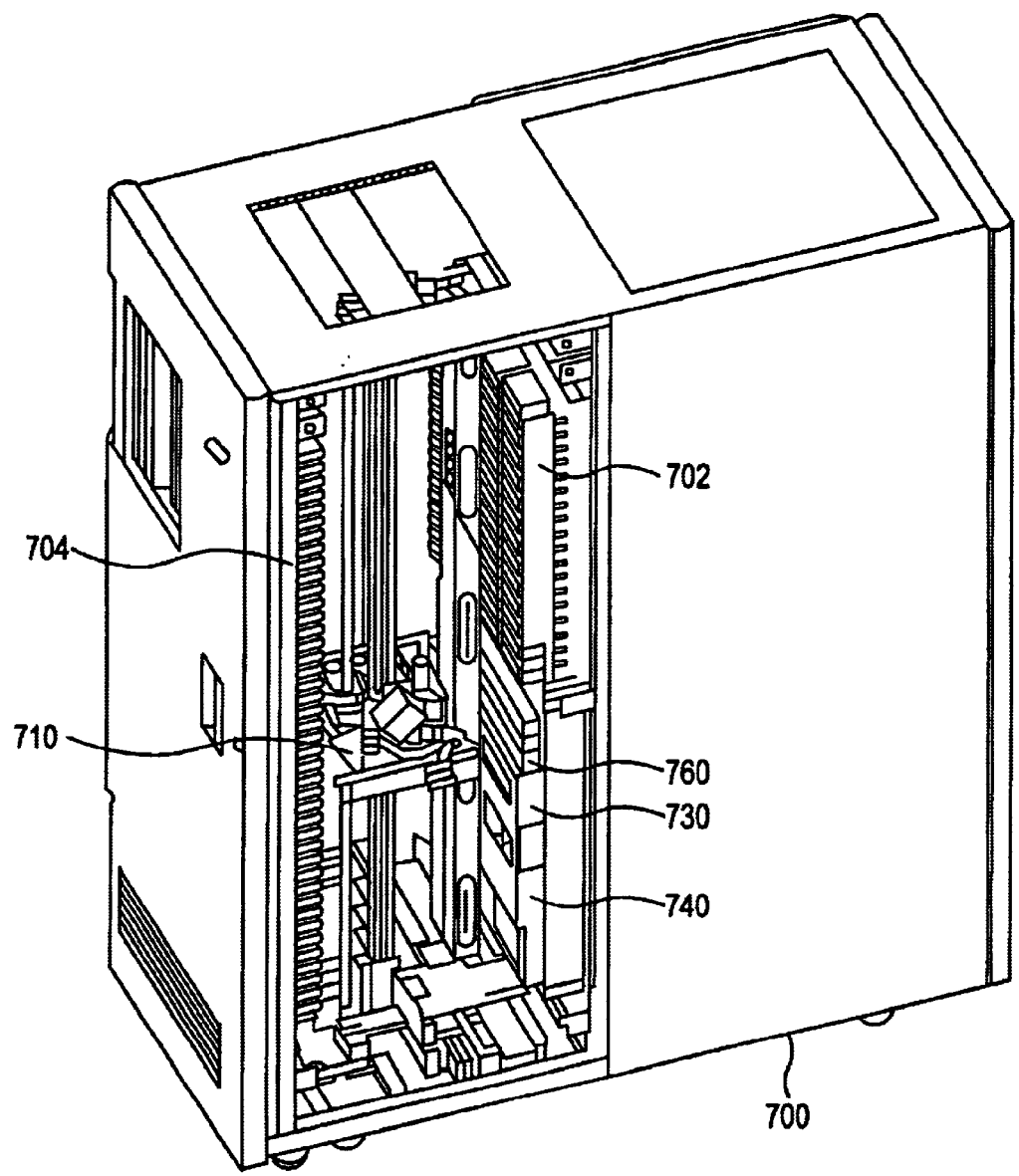
FIG. 7 shows a perspective view of a second embodiment of Applicants' data storage and retrieval system.

FIG. 7 shows system 700 which comprises another embodiment of Applicant's data storage and retrieval system. System 700 communicates with one or more host computers. System 700 includes first storage wall 702 and second storage wall 704. Storage walls 702 and 704 each include a plurality of storage elements in which can be stored a plurality of portable data storage cartridges. System 700 includes one or more input/output devices, such as devices 730 and 740. Input/output device 730/740 each comprise a disk drive, an optical disk drive, a magnetic tape drive, and the like. System 700 further includes controller/motion card pack 760. System 700 further includes operator control panel 750 (not shown in FIG. 7).

System 700 further includes one or a plurality of portable data storage cartridges comprising an information storage medium disposed in housing 100/101 (FIG. 1A)/101 (FIG. 1B), removeably disposed in one or more slots in storage walls 702/704. Such data storage media includes optical media, magnetic media, tape media, electronic media, and combinations thereof.

System 700 also includes at least one robotic accessor 710 for transporting a designated portable data storage cartridge between a storage slot disposed in first wall 702 or second wall 704 and input/output device 730/740. Accessor 710 includes lifting servo section 720 on which is disposed Applicants' cartridge locomotion apparatus described herein.

Applicants' invention includes a housing for an information storage medium, and a locomotion apparatus used to move that information storage medium into, and/or out of, various devices disposed in Applicants' data storage and retrieval system. In certain embodiments, Applicants' invention is used to move an information storage medium into, and/or out of, a data storage device. In certain embodiments, Applicants' invention is used to move an information storage medium into, and/or out of, a storage slot. In certain embodiments, Applicants' invention is used to move an information storage medium into, and/or out of, a robotic accessor. In certain embodiments, Applicants' invention is used to move an information storage medium into, and/or out of, an import/export station.

Figure 1A:
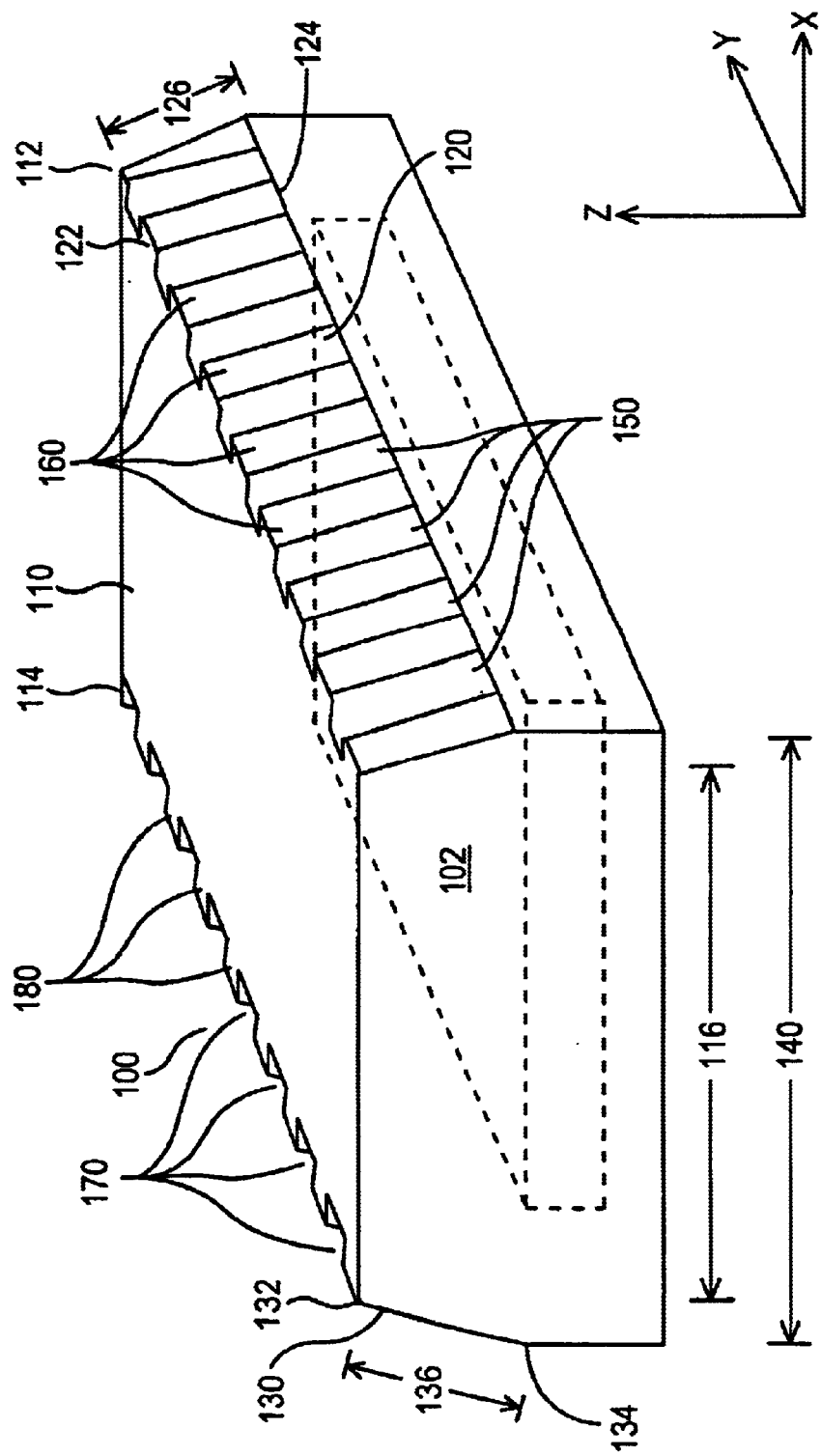
FIG. 1A shows a perspective view of a first embodiment of Applicants' housing.
Figure 1B:
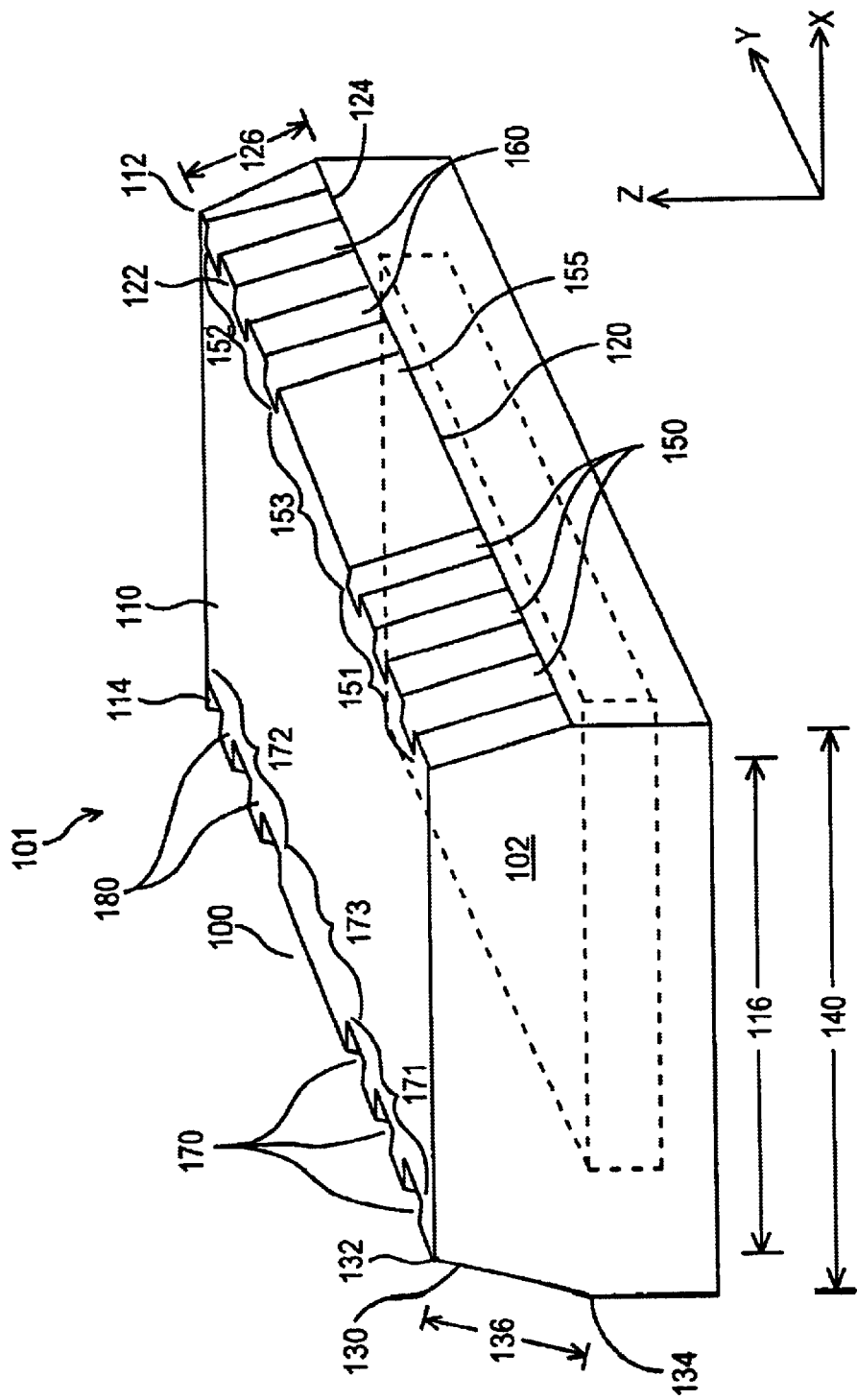
FIG. 1B shows a perspective view of a second embodiment of Applicants' housing.

FIG. 1A shows a perspective view of a first embodiment of Applicants' housing. Information storage medium 102 (FIGS. 1A, 1B, 3A, 4A, 4B, 5) is internally disposed within housing 100. Information storage medium 102 includes, for example, a magnetic information storage medium, an optical information storage medium, an electronic information storage medium, and the like. By electronic storage medium, Applicants mean a device such as a PROM, EPROM, EEPROM, Flash PROM, compactflash, smartmedia, and the like. Housing 100/101 (FIG. 1B) in combination with information storage medium 102 comprise a portable data storage cartridge. In certain embodiments, for example, housing 100/101 encases reel 210 (FIG. 2) around which is wound magnetic tape.

There are various features not shown on housing 100/101 (FIG. 1B), such as locating notches, write-inhibiting switches, and the like. Housing 100/101 is only exemplary, and certain housing embodiments of present invention are applicable to any configuration of housing 100/101, and are useful for enclosing various information storage media.

Housing 100 comprises includes first surface 110 comprising first edge 112 and second edge 114. First edge 112 and second edge 114 are separated by width 116. Surface 110 can be formed using any rigid material, including plastic, metal, and combinations thereof.

Housing 100 further includes surface 120 comprising edge 122 and edge 124 separated by width 126. Surface 120 can be formed using any rigid material, including plastic, metal, and combinations thereof. Edge 122 of surface 120 is attached to edge 112 of surface 110. In certain embodiments, surface 110 and surface 120 are integrally formed. In certain embodiments, surface 110 and surface 120 are separately formed and subsequently attached. Such attachment includes, for example, adhesive bonding, plastic welding, welding, use of mechanical fasteners, such as nuts, bolts, screws, and the like. Surface 120 further includes a plurality of grooves 150 disposed between edge 122 and edge 124. The plurality of grooves 150 defines a plurality of ribs 160, where each one of that plurality of ribs 160 is disposed between two of the plurality of grooves 150. The "ribbed" configuration of surface 120 facilitates manual or automated gripping of housing 100.

Housing 100 further includes surface 130 comprising edge 132 and edge 134 separated by width 136. In certain embodiments, width 126 and width 136 are substantially equal. By substantially equal, Applicants' mean width 126 equals width 136 plus or minus about ten percent. Surface 130 can be formed using any rigid material, including plastic, metal, and combinations thereof. Edge 132 of surface 130 is attached to edge 114 of surface 110. In certain embodiments, surface 110 and surface 130 are integrally formed. In certain embodiments, surface 110 and surface 130 are separately formed and subsequently attached. Such attachment includes, for example, adhesive bonding, plastic welding, welding, use of mechanical fasteners, such as nuts, bolts, screws, and the like. In certain embodiments, surface 130 further includes a plurality of grooves 170 disposed between edge 132 and edge 134. The plurality of grooves 170 defines a plurality of ribs 180, where each one of that plurality of ribs 180 is disposed between two of the plurality of grooves 170. The "ribbed" configuration of surface 130 facilitates manual or automated gripping of housing 100.

Edge 122 of surface 120 is continuously attached to edge 112 with surface 120 extending outwardly from surface 110. Edge 132 of surface 130 is continuously attached to edge 114 with surface 130 extending outwardly from surface 110. Edge 124 of surface 120 is separated from edge 134 of surface 130 by distance 140. In certain embodiments, distance 140 is greater than width 116. In certain embodiments, distance 140 is about five percent greater than width 116. In certain embodiments, distance 140 is about ten percent greater than width 116. In certain embodiments, distance 140 is about fifteen percent greater than width 116. In certain embodiments, distance 140 is about twenty-five percent greater than width 116.

FIG. 1B shows another embodiment of Applicants' housing. Housing 101 includes surfaces 110, 120, and 130. Surfaces 120 and 130, however, are only partially "ribbed." For example, in embodiment 101 surface 120 includes a first ribbed portion 151 and a second ribbed portion 152 separated by smooth side portion 153. First ribbed portion 151 and second ribbed portion 152 each include a plurality of grooves 150 separated by a plurality of ribs 160. In embodiment 101, surface 130 includes a first ribbed portion 171 and a second ribbed portion 172 separated by smooth side portion 173. First ribbed portion 171 and second ribbed portion 172 each include a plurality of grooves 170 separated by a plurality of ribs 180.

In other embodiments, Applicants' housing includes a textured surface 120/130 rather than a fully or partially ribbed surface 120/130. In certain of the textured surface embodiments, surfaces 120 and 130 include a plurality of bumps, protuberances, and the like. In certain embodiments, surfaces 120 and 130 include a plurality of dimples, depressions, and the like. In certain embodiments, surfaces 120 and 130 include a plurality of bumps, protuberances, and the like, in combination with a plurality of dimples, depressions, and the like. Embodiments of Applicants' housing which include bumps/protuberances and/or dimples/depressions, can be effectively used with Applicants' drive member embodiments discussed below.

FIG. 2 is a cross-section view along the Y axis of FIGS. 1A, 1B showing one embodiment of Applicants' housing. This embodiment of Applicants' housing comprises a tape cartridge, i.e. information storage medium 102 (FIGS. 1A, 1B, 3A, 4A, 4B, 5) comprises a magnetic tape medium. This embodiment of Applicants' housing includes tape reel 210 which comprises first flange 212, second flange 214, and hub 216. Flanges 212 and 214 connect to, and extend radially outward from, hub 216 forming a channel between them in which tape 250 (not shown in FIG. 2) is contained as that tape is wound around hub 216.

FIG. 3A shows Applicants' housing 100/101 disposed adjacent rotatable shaft 320. Cylindrical drive member 330 is disposed around shaft 320. Shaft 320 in combination with drive member 330 comprises a prior art locomotion assembly disposed in, for example, an automated cartridge feeder mechanism. Drive member 330 includes first side 332 having diameter 334 and second side 336 having a diameter 338. As shown in FIG. 3A, in this prior art apparatus diameter 332 is substantially equal to diameter 338.

Because distance 140 (FIGS. 1, 3A) is greater than width 116 (FIGS. 1, 3A), surface 120 extends outwardly and downwardly from surface 110 at an angle greater than ninety degrees. This being the case, only a portion of the periphery of drive member 330 can contact sloping surface 120. Therefore, as shaft 320 rotates only a small portion of drive member 320 contacts surface 120. As those skilled in the art will appreciate, as shaft 320 rotates the portion of drive member 330 in contact with surface 120 constantly changes. The portion of drive member 330 in contact with surface 120 at any point in time is represented by area 340.

Shaft 320 is caused to rotate in order to move housing 100/101 in either the +Y or the −Y direction. As those skilled in the art will appreciate, shaft 320 is rotated in a first direction, i.e. clockwise, to move housing 100/101 in a first direction, i.e. in the +Y direction. Alternatively, shaft 320 is rotated in a second direction, i.e. counterclockwise rotation, to move housing 100/101 in the −Y direction. As housing moves in either the +Y or in the −Y direction, area 340 of drive member 320 contacts only a small area of surface 120. As those skilled in the art will appreciate, that contacted area of surface 120 changes as housing 100/101 moves. The portion of surface 120 contacted by area 340 at any one point in time is represented by area 350.

FIG. 3B shows a view in the −Z direction, i.e. a "top" view, of the contact between area 340 of drive member 330 and area 350 of surface 120. Because of the "ribbed" configuration of surface 120, and because of the "sloping" orientation of surface 120, the contact area defined by areas 340 and 350 is limited. Because of this small contact area, locomotion assembly 330 does not effectively move housing 100/101. Rather, Applicants have found that slippage events frequently occur during which area 340 slides over area 350 rather than effectively gripping area 350. During such slippage events, housing 100/101 does not move. Such a failure to move housing 100/101 necessarily results in a failure to properly dispose information storage medium 102 (FIGS. 1A, 1B, 3A, 4A, 4B, 5) in, for example, a data storage device. Thus, a failure to move housing 100/101, necessarily results in a failure to, for example, read information from, and/or write information to, information storage medium 102.

Figure 4A:
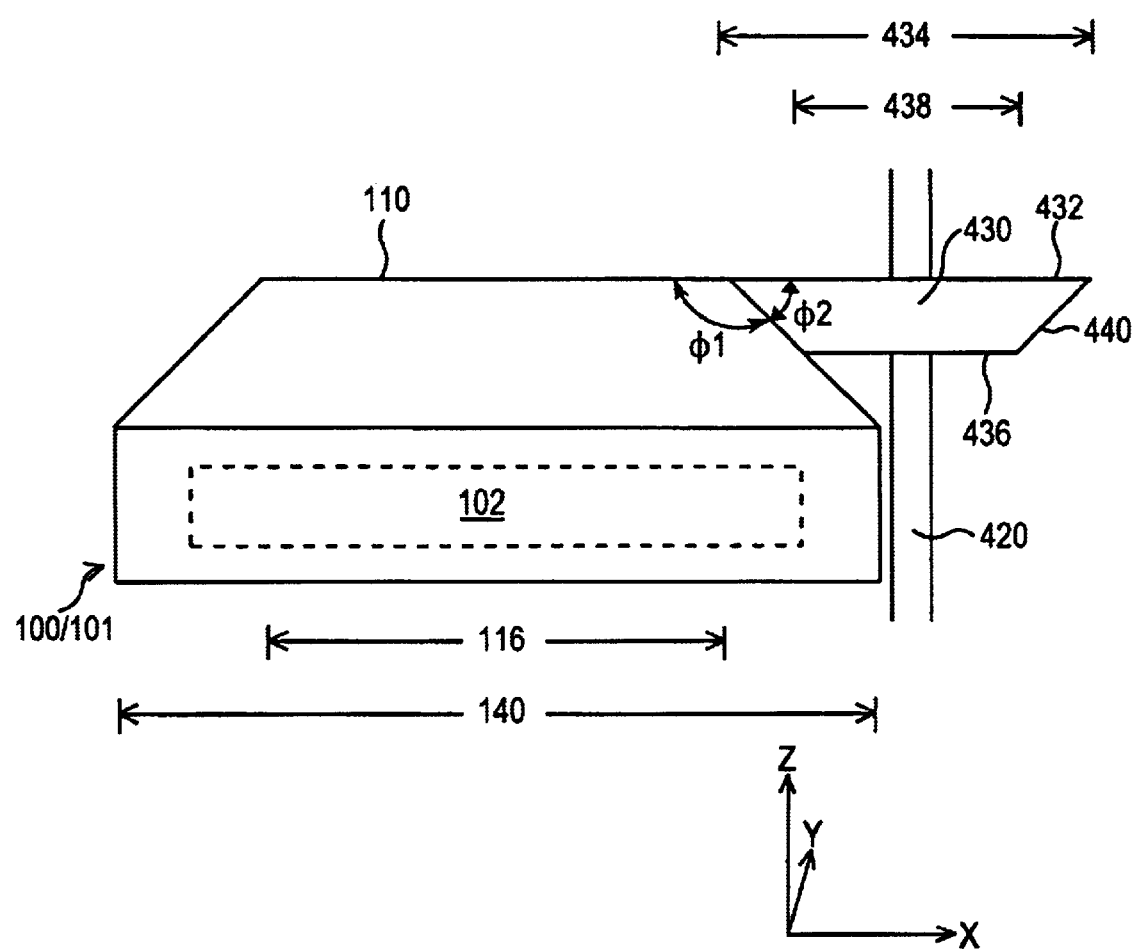
FIG. 4A shows a perspective view of Applicants' housing disposed in a first embodiment of Applicants' locomotion apparatus.

FIG. 4A shows Applicants' housing 100/101 disposed adjacent Applicants' locomotion assembly comprising rotatable shaft 420 and drive member 430. Drive member 430 is disposed symmetrically around shaft 420. In certain embodiments, drive member 430 comprises a compliant material. By compliant material, Applicants' mean a material having a hardness of between about 25 Shore A and about 95 Shore A. In certain embodiments, drive member 430 comprises one or more elastomers. Such elastomers include, for example, natural rubber, polyisoprene, polyisobutylene, plasticized polyvinylchloride, mixtures thereof, and the like. As those skilled in the art will appreciate, other elastomeric materials, and/or combinations of elastomeric materials, may be used to form drive member 430.

Drive member 430 includes first side 432 having first diameter 434 and second side 436 having second diameter 438. First side 432 and second side 436 are joined by drive surface 440. Drive surface 440 and first side 432 define second angle Φ2.

As discussed above, surface 120 of housing 100/101 attaches to, and extends outwardly from, surface 110. Surface 110 and surface 120 define first angle Φ1. First angle Φ1 is greater than about 90 degrees. The distances 116 and 140, and diameters 434 and 438, are adjusted such that the sum of Φ1+Φ2 is substantially equal to 180 degrees. Substantially equal has the meaning recited above. In certain embodiments, first angle Φ1 is greater than about 105 degrees. In certain embodiments, first angle Φ1 is greater than about 115 degrees. In certain embodiments, first angle Φ1 is greater than about 125 degrees.

Figure 4B:
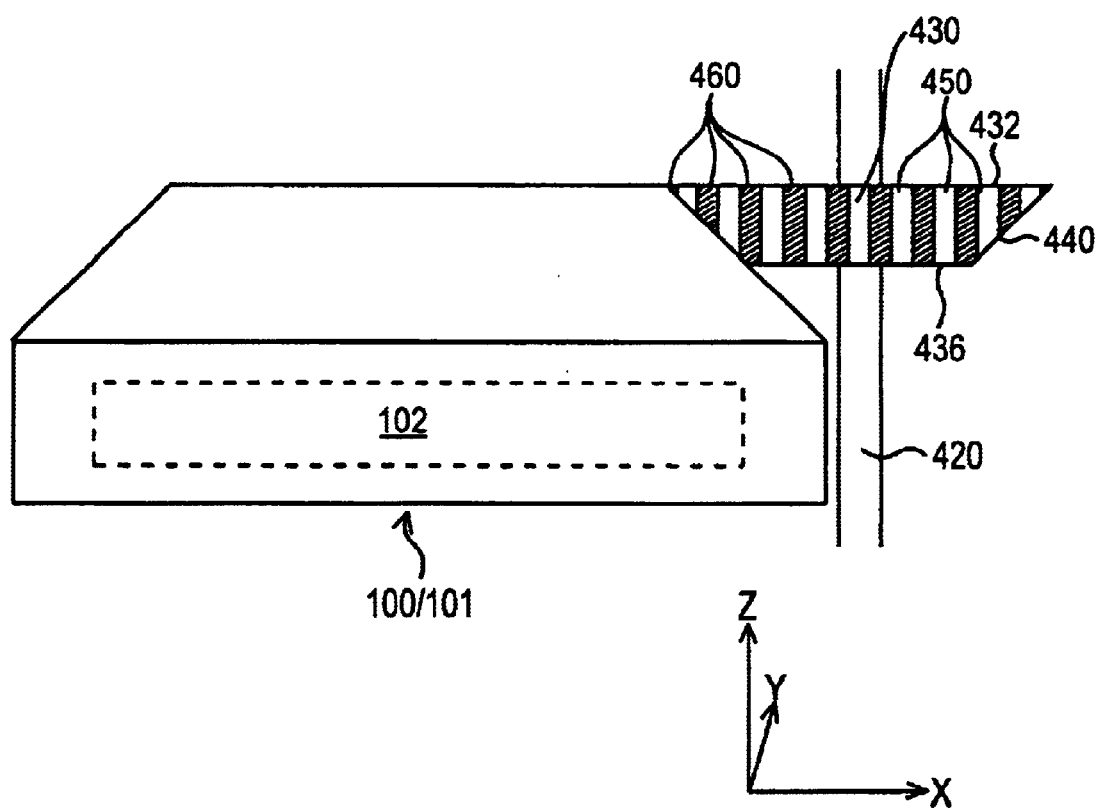
FIG. 4B shows a perspective view of Applicants' housing disposed in a second embodiment of Applicants' locomotion apparatus.
Figure 4C:
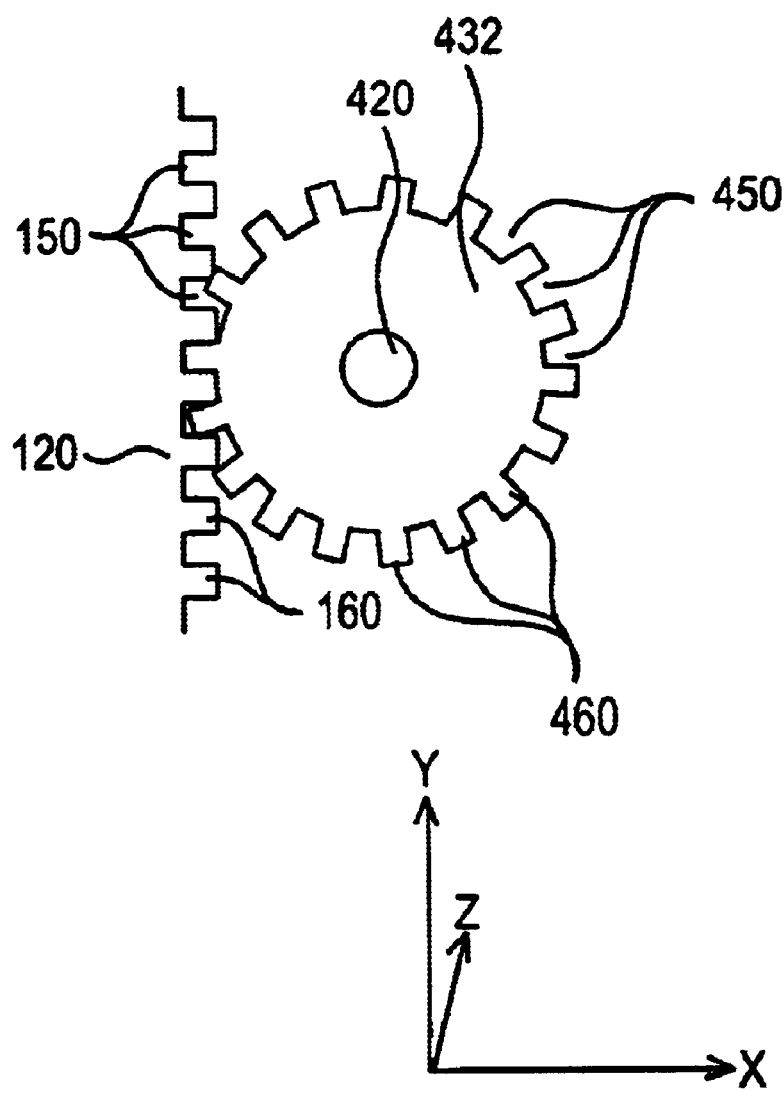
FIG. 4C shows a top view of a portion of one surface of the first embodiment of Applicants' housing and a portion of the second embodiment of Applicants' locomotion apparatus of FIG. 4B.

Referring now to FIG. 4B, in certain embodiments of Applicants' invention drive member 430 includes a plurality of grooves 450 disposed between first side 432 and second side 436. Plurality of grooves 450 define a plurality of ribs 460 extending outwardly from surface 440, where each of the plurality of ribs 460 is disposed between two of the plurality of grooves 450. FIG. 4C is a top view showing the contact between drive member 430 and surface 120 using Applicants' locomotion apparatus. When using Applicants' method, housing 100/101 is positioned adjacent shaft 420 such that one or more of ribs 460 (FIGS. 4B, 4C) intermesh with one or more of grooves 150 (FIGS. 1, 4C).

Rotating shaft 420 in the clockwise direction rotates drive member 430 in the clockwise direction. As drive member 430 rotates, one or more of plurality of ribs 460 are individually inserted into one or more of grooves 150 as those ribs contact surface 120. For example and referring to FIGS. 4B and 4C, as shaft 420 rotates in a first direction, such as the clockwise direction around the Z axis, housing 100/101 is moved in a second direction, i.e. in the +Y direction. As shaft 420 continues to rotate, a plurality of ribs 460 are individually and sequentially inserted into individual grooves disposed on surface 120. The one or more ribs removeably disposed in one of more grooves at any point in time transfer the rotational force of shaft 320 to housing 100/101. As housing 100/101 continues to move in the +Y direction, these one or more ribs 460 are sequentially removed from their respective grooves on surface 120. Similarly, as shaft 420 rotates in a third direction, i.e. in the counterclockwise direction around the Z axis, housing 100/101 is moved in a fourth direction, i.e. in the −Y direction.

The insertion of one or more of ribs 460 into one or more grooves 150 provides a secure, continuous, yet releaseably, attachment of housing 100/101 to drive member 430. Such a releaseable attachment prevents the occurrence of slippage events discussed above. Therefore, use of Applicants' housing in combination with Applicants' locomotion apparatus provides a reliable method to move a portable information storage medium into, and out of, for example, a cartridge magazine, a data storage device, a robotic accessor, a storage cell, an input/output stations, and the like.

Applicants have also found that drive member 430 works effectively with housings comprising smooth surfaces 120 and 130. The ribbed configuration of drive member 430 effectively grips such a smooth surface, and Applicants' locomotion apparatus effectively moves such a smooth-sided housing using drive member 430.

Figure 4D:
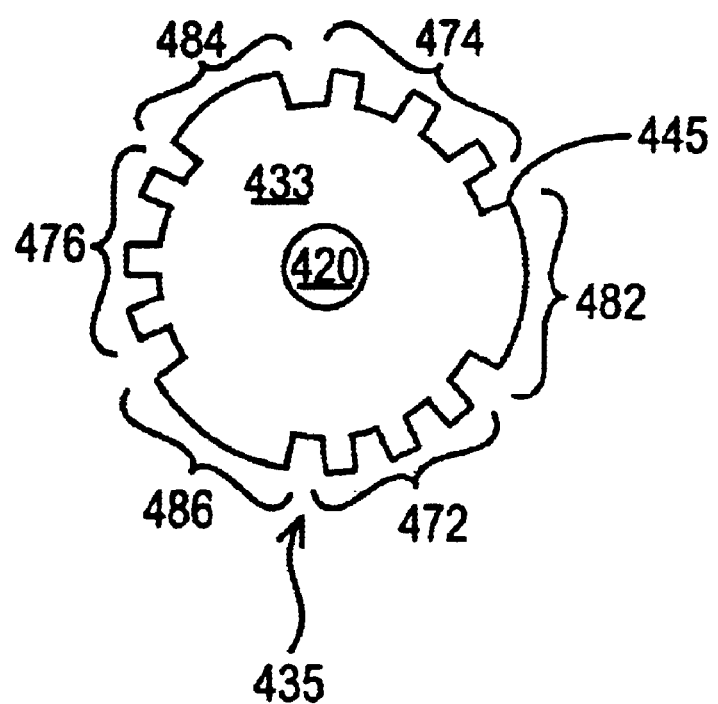
FIG. 4D shows a top portion of a third embodiment of Applicants' locomotion apparatus.

FIG. 4D shows another embodiment of Applicants' drive member, namely drive member 435. Drive member 435 includes first side 433 having first diameter 434 (FIG. 4A), second side 437 (Not shown in FIGS.) having second diameter 438 (FIG. 4A). First side 433 and second side 437 are joined by drive surface 445. Drive surface 445 and first side 433 define second angle Φ2 (FIG. 4A).

As discussed above, surface 120 of housing 100/101/101 attaches to, and extends outwardly from, surface 110. Surface 110 and surface 120 define first angle Φ1. First angle Φ1 is greater than about 90 degrees. The distances 116 and 140, and diameters 434 and 438, are adjusted such that the sum of Φ1+Φ2 is substantially equal to 180 degrees.

Drive surface 445 includes a plurality of ribbed portions, i.e. portions 472, 474, and 476, each disposed between two smooth portions, i.e. portions 482, 484, and 486. The embodiment of Applicants' drive member shown in FIG. 4D includes a drive surface having three ribbed portions and three smooth portions. In other embodiments, Applicants' drive member includes a drive surface having more than three ribbed portions and more than three smooth portions.

FIG. 4E shows drive member 435 disposed against surface 120 of housing 101 (FIG. 1B). The ribbed portion of drive surface 435 intermeshes with the ribbed portion of housing 101. More specifically, one or more of ribs 460 intermesh with one or more of grooves 150. Applicants have also found that drive member 435 works effectively with housings comprising smooth surfaces 120 and 130. The alternating ribbed/smooth configuration of drive member 445 effectively grips such a smooth surface, and Applicants' locomotion apparatus effectively moves such a smooth-sided housing using drive member 435.

In certain embodiments Applicants' locomotion apparatus includes two rotatable shafts and two drive members. For example, FIG. 5 shows an embodiment of Applicants' invention which includes housing 100/101 (FIG. 1A)/101 (FIG. 1B), information storage medium 102 (FIGS. 1A, 1B, 3A, 4A, 4B, 5) internally disposed in that housing, rotatable shaft 520, drive member 530 disposed around shaft 520, rotatable shaft 540, and drive member 550 disposed around shaft 550. Drive members 530 and 550 each include a ribbed drive surface as described above. The ribs disposed on drive member 530 intermesh with grooves 150 (FIGS. 1, 3B, 4C) disposed on surface 120. The ribs disposed on drive member 550 intermesh with grooves 170 (FIGS. 1A, 1B) disposed on surface 130 (FIGS. 1, 5).

Shafts 520 and 540 are counter-rotating, i.e. the rotations of shafts 520 and 540 are coordinated such when shaft 520 rotates in a first direction, such as clockwise around the Z axis of FIG. 5, shaft 540 rotates in a second direction, such as counter-clockwise around the Z axis. When shaft 520 is rotated in the first direction, and shaft 540 is rotated in the second direction, housing 100/101 moves in a third direction, i.e. in the +Y direction. Alternatively, when shaft 520 is rotated in the second direction, and shaft 540 is rotated in the first direction, housing 100/101 moves in a fourth direction, i.e. in the −Y direction.

Applicants' invention includes cartridge magazines, data storage devices, robotic accessors, storage cells, and input/output stations, comprising at least one rotating shaft, such as shaft 420, at least one drive member symmetrically disposed around that shaft, wherein that drive member has the shape of a truncated cone, such as drive member 430, such that the rotatable shaft in combination with the drive member can move Applicants' housing 100/101, and the information storage medium disposed therein, in at least one direction. In certain embodiments, Applicants' invention includes cartridge magazines, data storage devices, robotic accessors, storage cells, and input/output stations, that can move Applicants' housing, and the information storage medium disposed therein, in a first direction, and in a substantially opposite second direction. In certain embodiments, Applicants' invention includes cartridge magazines, data storage devices, robotic accessors, storage cells, and input/output stations, comprising two rotatable shafts in combination with two drive members as shown in FIG. 5.

Applicants' invention includes a data storage and retrieval system comprising one or more information storage media disposed in one or more of Applicants' housings, and one or more of Applicants' locomotion apparatus disposed in one or more robotic accessors, and/or one or more storage slots, and/or one or more data storage devices, and/or one or more cartridge magazines, and/or one or more input/output stations.

While the preferred embodiments of the present invention have been illustrated in detail, it should be apparent that modifications and adaptations to those embodiments may occur to one skilled in the art without departing from the scope of the present invention as set forth in the following claims.

We claim:

1. An apparatus to move a portable information storage medium, comprising:

a housing for said information storage medium, comprising:
  a first surface having a first width, a first edge, and an opposing second edge;
  a second surface having a second width, a third edge, an opposing fourth edge, wherein said third edge is attached to said first edge, and wherein said second surface includes a first plurality of grooves disposed between said third edge and said fourth edge;
  a third surface having a third width, a fifth edge, and an opposing sixth edge, wherein said fifth edge is attached to said second edge;
  wherein said second width is substantially equal to said third width, and wherein said fourth edge and said sixth edge are separated by a first distance, wherein said first distance is greater than said first width;
a first rotatable shaft;
a first drive member disposed around said rotatable shaft, wherein said first drive member comprises a first side having a first diameter, an opposing second side having a second diameter, and a first drive surface connecting said first side and said second side;
wherein said first drive surface includes a first plurality of ribs disposed between said first side and said second side, and wherein said first diameter is greater than said second diameter; and
wherein one or more of said first plurality of ribs intermeshes with one or more of said first plurality of grooves.

2. The apparatus of claim 1, wherein said first drive member comprises an elastomer.

3. The apparatus of claim 2, wherein said first drive member has a hardness of between about 25 Shore A and about 95 Shore A.

4. The apparatus of claim 1, further comprising:
a second rotatable shaft;
a second drive member disposed around said second rotatable shaft, wherein said second drive member comprises a third side having a third diameter, an opposing fourth side having a fourth diameter, and a second drive surface connecting said third side and said fourth side, wherein said third diameter is greater than said fourth diameter;
wherein said second drive surface includes a second plurality of ribs disposed between said third side and said fourth side;
wherein said third surface of said housing further comprises a second plurality of grooves disposed between said fifth edge and said sixth edge; and
wherein said second plurality of ribs intermeshes with said second plurality of grooves.

5. The apparatus of claim 4, wherein said second drive member comprises an elastomer.

6. The apparatus of claim 5, wherein said second drive member has a hardness of between about 25 Shore A and about 95 Shore A.

7. An apparatus to move a portable information storage medium, comprising:
a housing for said information storage medium, comprising:
  a first surface having a first width, a first edge, and an opposing second edge;
  a second surface having a second width, a third edge, an opposing fourth edge;
  wherein said second surface includes a first plurality of grooves disposed between said third edge and said fourth edge, and wherein said third edge is attached to said first edge;
a third surface having a third width, a fifth edge, and an opposing sixth edge;
wherein said third surface includes a second plurality of grooves disposed between said fifth edge and said sixth edge, and wherein said fifth edge is attached to said second edge;
wherein said second width is substantially equal to said third width, and wherein said fourth edge and said sixth edge are separated by a first distance, wherein said first distance is greater than said first width;
a first rotatable shaft;
a first drive member disposed around said rotatable shaft, wherein said first drive member comprises a first side having a first diameter, an opposing second side having a second diameter, and a first drive surface connecting said first side and said second side;
wherein said first drive surface includes a first plurality of ribs disposed between said first side and said second side, and wherein said first diameter is greater than said second diameter, and wherein said first drive member has a hardness of between about 25 Shore A and about 95 Shore A;
a second rotatable shaft;
a second drive member disposed around said second rotatable shaft, wherein said second drive member comprises a third side having a third diameter, an opposing fourth side having a fourth diameter, and a second drive surface connecting said third side and said fourth side, wherein said third diameter is greater than said fourth diameter;
wherein said second drive surface includes a second plurality of ribs disposed between said third side and said fourth side, and wherein said second drive member comprises a material having a hardness of between about 25 Shore A and about 95 Shore A;
wherein said first rotatable shaft is disposed adjacent said second surface of said housing, and wherein one or more of said first plurality of ribs intermeshes with one or more of said first plurality of grooves; and
wherein said second rotatable shaft is disposed adjacent said third surface of said housing, and wherein one or more of said second plurality of ribs intermeshes with one or more of said second plurality of grooves.

8. A data storage and retrieval system, comprising:
one or more portable data storage cartridges moveably disposed therein, wherein each of said one or more portable data storage cartridges comprises:
an information storage medium disposed in a housing, wherein said housing comprises:
a first surface having a first width, a first edge, and an opposing second edge;
a second surface having a second width, a third edge, an opposing fourth edge, and a first plurality of grooves disposed between said third edge and said fourth edge, wherein said third edge is attached to said first edge;
a third surface having a third width, a fifth edge, and an opposing sixth edge, wherein said fifth edge is attached to said second edge;
wherein said second width is substantially equal to said third width, and wherein said fourth edge and said sixth edge are separated by a first distance, wherein said first distance is greater than said first width;
a data storage device, comprising:
a first rotatable shaft;
a first drive member disposed around said rotatable shaft, wherein said first drive member comprises a first side having a first diameter, an opposing second side having a second diameter, and a first drive surface connecting said first side and said second side;
wherein said first drive surface includes a first plurality of ribs disposed between said first side and said second side, and wherein said first diameter is greater than said second diameter; and
wherein said first rotatable shaft is disposed in said data storage device such that one or more of said first plurality of ribs intermeshes with one or more of said first plurality of grooves, such that said housing is moved within said data storage device when said first rotatable shaft is rotated.

9. The data storage and retrieval system of claim 8, wherein said data storage device further comprises:
a second rotatable shaft;
a second drive member disposed around said second rotatable shaft, wherein said second drive member comprises a third side having a third diameter, an opposing fourth side having a fourth diameter, and a second drive surface connecting said third side and said fourth side, wherein said third diameter is greater than said fourth diameter;
wherein said second drive surface includes a second plurality of ribs disposed between said third side and said fourth side;
wherein said third surface of said housing further comprises a second plurality of grooves disposed between said third edge and said fourth edge; and
wherein said second rotatable shaft is disposed in said data storage device such that one or more of said second plurality of ribs intermeshes with one or more of said second plurality of grooves, such that said housing is moved within said data storage device when said second rotatable shaft is rotated.

10. The data storage and retrieval system of claim 8, wherein said accessor further comprises:
a second rotatable shaft;
a second drive member disposed around said second rotatable shaft, wherein said second drive member comprises a third side having a third diameter, an opposing fourth side having a fourth diameter, and a second drive surface connecting said third side and said fourth side, wherein said third diameter is greater than said fourth diameter;
wherein said second drive surface includes a second plurality of ribs disposed between said third side and said fourth side;
wherein said third surface of said housing further comprises a second plurality of grooves disposed between said third edge and said fourth edge; and
wherein said second rotatable shaft is disposed on said accessor such that one or more of said second plurality of ribs intermeshes with one or more of said second plurality of grooves, such that said housing is moved onto said accessor when said second rotatable shaft is rotated in a second direction and off said accessor when said second rotatable shaft is rotated in a first direction.

11. A data storage and retrieval system, comprising:
one or more portable data storage cartridges moveably disposed therein, wherein each of said one or more portable data storage cartridges comprises:

an information storage medium disposed within a housing, wherein said housing comprises:
  a first surface having a first width, a first edge, and an opposing second edge;
  a second surface having a second width, a third edge, an opposing fourth edge, and a first plurality of grooves disposed between said third edge and said fourth edge, wherein said third edge is attached to said first edge;
  a third surface having a third width, a fifth edge, and an opposing sixth edge, wherein said fifth edge is attached to said second edge;
  wherein said second width is substantially equal to said third width, and wherein said fourth edge and said sixth edge are separated by a first distance, wherein said first distance is greater than said first width;

a data storage device, comprising:
  a first rotatable shaft;
  a first drive member disposed around said rotatable shaft, wherein said first drive member comprises a first side having a first diameter, an opposing second side having a second diameter, and a first drive surface connecting said first side and said second side;
  wherein said first drive surface includes a first plurality of ribs disposed between said first side and said second side, and wherein said first diameter is greater than said second diameter, and wherein said first drive member comprises a material having a hardness of between about 25 Shore A and about 95 Shore A;
  a second rotatable shaft;
  a second drive member disposed around said second rotatable shaft, wherein said second drive member comprises a third side having a third diameter, an opposing fourth side having a fourth diameter, and a second drive surface connecting said third side and said fourth side, wherein said third diameter is greater than said fourth diameter;
  wherein said second drive surface includes a second plurality of ribs disposed between said third side and said fourth side, and wherein said second drive member comprises a material having a hardness of between about 25 Shore A and about 95 Shore A;
  wherein said first rotatable shaft is disposed in said data storage device such that one or more of said first plurality of ribs intermeshes with one or more of said first plurality of grooves, such that said housing is moved within said data storage device when said first rotatable shaft is rotated; and
  wherein said first rotatable shaft is disposed in said data storage device such that one or more of said second plurality of ribs intermeshes with one or more of said second plurality of grooves, such that said housing is moved within said data storage device when said second rotatable shaft is rotated.

12. A data storage and retrieval system, comprising:
one or more portable data storage cartridges moveably disposed therein, wherein each of said one or more portable data storage cartridges comprises:
an information storage medium disposed in a housing, wherein said housing comprises:
one or more portable data storage cartridges moveably disposed therein, wherein each of said one or more portable data storage cartridges comprises:
an information storage medium disposed in a housing, wherein said housing comprises:
  a first surface having a first width, a first edge, and an opposing second edge;
  a second surface having a second width, a third edge, an opposing fourth edge, and a first plurality of grooves disposed between said third edge and said fourth edge, wherein said third edge is attached to said first edge;
  a third surface having a third width, a fifth edge, and an opposing sixth edge, wherein said fifth edge is attached to said second edge;
  wherein said second width is substantially equal to said third width, and wherein said fourth edge and said sixth edge are separated by a first distance, wherein said first distance is greater than said first width;

an accessor, comprising:
  a first rotatable shaft;
  a first drive member disposed around said rotatable shaft, wherein said first drive member comprises a first side having a first diameter, an opposing second side having a second diameter, and a first drive surface connecting said first side and said second side;
  wherein said first drive surface includes a first plurality of ribs disposed between said first side and said second side, and wherein said first diameter is greater than said second diameter; and
  wherein said first rotatable shaft is disposed on said accessor such that one or more of said first plurality of ribs intermeshes with one or more of said first plurality of grooves, such that said housing is moved onto said accessor when said first rotatable shaft is rotated in a first direction and off said accessor when said first rotatable shaft is rotated in a second direction.

13. A data storage and retrieval system, comprising:
one or more portable data storage cartridges moveably disposed therein, wherein each of said one or more portable data storage cartridges comprises:
an information storage medium disposed within a housing, wherein said housing comprises:
  a first surface having a first width, a first edge, and an opposing second edge;
  a second surface having a second width, a third edge, an opposing fourth edge, and a first plurality of grooves disposed between said third edge and said fourth edge, wherein said third edge is attached to said first edge;
  a third surface having a third width, a fifth edge, and an opposing sixth edge, wherein said fifth edge is attached to said second edge;
  wherein said second width is substantially equal to said third width, and wherein said fourth edge and said sixth edge are separated by a first distance, wherein said first distance is greater than said first width;

an accessor, comprising:
  a first rotatable shaft;
  a first drive member disposed around said rotatable shaft, wherein said first drive member comprises a first side having a first diameter, an opposing second side having a second diameter, and a first drive surface connecting said first side and said second side;
  wherein said first drive surface includes a first plurality of ribs disposed between said first side and said second side, and wherein said first diameter is greater than said second diameter, and wherein said first drive member comprises a material having a hardness of between about 25 Shore A and about 95 Shore A;
a second rotatable shaft;
a second drive member disposed around said second rotatable shaft, wherein said second drive member comprises a third side having a third diameter, an opposing fourth side having a fourth diameter, and a second drive surface connecting said third side and said fourth side, wherein said third diameter is greater than said fourth diameter;
wherein said second drive surface includes a second plurality of ribs disposed between said third side and said fourth side, and wherein said second drive member comprises a material having a hardness of between about 25 Shore A and about 95 Shore A;
wherein said first rotatable shaft is disposed on said accessor such that one or more of said first plurality of ribs intermeshes with one or more of said first plurality of grooves, such that said housing is moved onto said accessor when said first rotatable shaft is rotated in a first direction and off said accessor when said first rotatable shaft is rotated in a second direction; and
wherein said second rotatable shaft is disposed on said accessor such that one or more of said second plurality of ribs intermeshes with one or more of said second plurality of grooves, such that said housing is moved onto said accessor when said second rotatable shaft is rotated in said second direction and off said accessor when said second rotatable shaft is rotated in said first direction.

14. A data storage and retrieval system, comprising:
one or more portable data storage cartridges moveably disposed therein, wherein each of said one or more portable data storage cartridges comprises:
an information storage medium disposed in a housing, wherein said housing comprises:
one or more portable data storage cartridges moveably disposed therein, wherein each of said one or more portable data storage cartridges comprises:
an information storage medium disposed in a housing, wherein said housing comprises:
a first surface having a first width, a first edge, and an opposing second edge;
a second surface having a second width, a third edge, an opposing fourth edge, and a first plurality of grooves disposed between said third edge and said fourth edge, wherein said third edge is attached to said first edge;
a third surface having a third width, a fifth edge, and an opposing sixth edge, wherein said fifth edge is attached to said second edge;
wherein said second width is substantially equal to said third width, and wherein said fourth edge and said sixth edge are separated by a first distance, wherein said first distance is greater than said first width;
an input/output station, comprising:
a first rotatable shaft;
a first drive member disposed around said rotatable shaft, wherein said first drive member comprises a first side having a first diameter, an opposing second side having a second diameter, and a first drive surface connecting said first side and said second side;
wherein said first drive surface includes a first plurality of ribs disposed between said first side and said second side, and wherein said first diameter is greater than said second diameter; and
wherein said first rotatable shaft is disposed in said input/output station such that one or more of said first plurality of ribs intermeshes with one or more of said first plurality of grooves, such that said housing is moved within said input/output station when said first rotatable shaft is rotated.

15. The data storage and retrieval system of claim 14, wherein said input/output station further comprises:
a second rotatable shaft;
a second drive member disposed around said second rotatable shaft, wherein said second drive member comprises a third side having a third diameter, an opposing fourth side having a fourth diameter, and a second drive surface connecting said third side and said fourth side, wherein said third diameter is greater than said fourth diameter;
wherein said second drive surface includes a second plurality of ribs disposed between said third side and said fourth side;
wherein said third surface of said housing further comprises a second plurality of grooves disposed between said third edge and said fourth edge; and
wherein said second rotatable shaft is disposed in said input/output station such that one or more of said second plurality of ribs intermeshes with one or more of said second plurality of grooves, such that said housing is moved within said input/output station when said second rotatable shaft is rotated.

16. A data storage and retrieval system, comprising:
one or more portable data storage cartridges moveably disposed therein, wherein each of said one or more portable data storage cartridges comprises:
an information storage medium disposed within a housing, wherein said housing comprises:
a first surface having a first width, a first edge, and an opposing second edge;
a second surface having a second width, a third edge, an opposing fourth edge, and a first plurality of grooves disposed between said third edge and said fourth edge, wherein said third edge is attached to said first edge;
a third surface having a third width, a fifth edge, and an opposing sixth edge, wherein said fifth edge is attached to said second edge;
wherein said second width is substantially equal to said third width, and wherein said fourth edge and said sixth edge are separated by a first distance, wherein said first distance is greater than said first width;
an input/output station, comprising:
a first rotatable shaft;
a first drive member disposed around said rotatable shaft, wherein said first drive member comprises a first side having a first diameter, an opposing second side having a second diameter, and a first drive surface connecting said first side and said second side;
wherein said first drive surface includes a first plurality of ribs disposed between said first side and said second side, and wherein said first diameter is greater than said second diameter, and wherein said first drive member comprises a material having a hardness of between about 25 Shore A and about 95 Shore A;
a second rotatable shaft;

a second drive member disposed around said second rotatable shaft, wherein said second drive member comprises a third side having a third diameter, an opposing fourth side having a fourth diameter, and a second drive surface connecting said third side and said fourth side, wherein said third diameter is greater than said fourth diameter;

wherein said second drive surface includes a second plurality of ribs disposed between said third side and said fourth side, and wherein said second drive member comprises a material having a hardness of between about 25 Shore A and about 95 Shore A;

wherein said first rotatable shaft is disposed in said input/output station such that one or more of said first plurality of ribs intermeshes with one or more of said first plurality of grooves, such that said housing is moved within said input/output station when said first rotatable shaft is rotated; and wherein said second rotatable shaft is disposed in said input/output station such that one or more of said second plurality of ribs intermeshes with one or more of said second plurality of grooves, such that said housing is moved within said input/output station when said second rotatable shaft is rotated.

17. A data storage and retrieval system, comprising:

one or more portable data storage cartridges moveably disposed therein, wherein each of said one or more portable data storage cartridges comprises:

an information storage medium disposed in a housing, wherein said housing comprises:

one or more portable data storage cartridges moveably disposed therein, wherein each of said one or more portable data storage cartridges comprises:

an information storage medium disposed in a housing, wherein said housing comprises:
  a first surface having a first width, a first edge, and an opposing second edge;
  a second surface having a second width, a third edge, an opposing fourth edge, and a first plurality of grooves disposed between said third edge and said fourth edge, wherein said third edge is attached to said first edge;
  a third surface having a third width, a fifth edge, and an opposing sixth edge, wherein said fifth edge is attached to said second edge;
  wherein said second width is substantially equal to said third width, and wherein said fourth edge and said sixth edge are separated by a first distance, wherein said first distance is greater than said first width;

a cartridge magazine, comprising:
  a first rotatable shaft;
  a first drive member disposed around said rotatable shaft, wherein said first drive member comprises a first side having a first diameter, an opposing second side having a second diameter, and a first drive surface connecting said first side and said second side;
  wherein said first drive surface includes a first plurality of ribs disposed between said first side and said second side, and wherein said first diameter is greater than said second diameter; and
  wherein said first rotatable shaft is disposed adjacent said cartridge magazine such that one or more of said first plurality of ribs intermeshes with one or more of said first plurality of grooves, such that said housing is moved into said cartridge magazine when said first rotatable shaft is rotated in a first direction and out of said cartridge magazine when said first rotatable shaft is rotated in a second direction.

18. The data storage and retrieval system of claim 17, wherein said cartridge magazine further comprises:
  a second rotatable shaft;
  a second drive member disposed around said second rotatable shaft, wherein said second drive member comprises a third side having a third diameter, an opposing fourth side having a fourth diameter, and a second drive surface connecting said third side and said fourth side, wherein said third diameter is greater than said fourth diameter;
  wherein said second drive surface includes a second plurality of ribs disposed between said third side and said fourth side;
  wherein said third surface of said housing further comprises a second plurality of grooves disposed between said third edge and said fourth edge; and
  wherein said second rotatable shaft is disposed adjacent said cartridge magazine such that one or more of said second plurality of ribs intermeshes with one or more of said second plurality of grooves, such that said housing is moved into said cartridge magazine when said second rotatable shaft is rotated in said second direction and out of said cartridge magazine when said second rotatable shaft is rotated in said first direction.

19. A data storage and retrieval system, comprising:

one or more portable data storage cartridges moveably disposed therein, wherein each of said one or more portable data storage cartridges comprises:

an information storage medium disposed within a housing, wherein said housing comprises:
  a first surface having a first width, a first edge, and an opposing second edge;
  a second surface having a second width, a third edge, an opposing fourth edge, and a first plurality of grooves disposed between said third edge and said fourth edge, wherein said third edge is attached to said first edge;
  a third surface having a third width, a fifth edge, and an opposing sixth edge, wherein said fifth edge is attached to said second edge;
  wherein said second width is substantially equal to said third width, and wherein said fourth edge and said sixth edge are separated by a first distance, wherein said first distance is greater than said first width;

a cartridge magazine, comprising:
  a first rotatable shaft;
  a first drive member disposed around said rotatable shaft, wherein said first drive member comprises a first side having a first diameter, an opposing second side having a second diameter, and a first drive surface connecting said first side and said second side;
  wherein said first drive surface includes a first plurality of ribs disposed between said first side and said second side, and wherein said first diameter is greater than said second diameter, and wherein said first drive member comprises a material having a hardness of between about 25 Shore A and about 95 Shore A;
  a second rotatable shaft;
  a second drive member disposed around said second rotatable shaft, wherein said second drive member comprises a third side having a third diameter, an opposing fourth side having a fourth diameter, and a second drive surface connecting said third side and said fourth side, wherein said third diameter is greater than said fourth diameter;

wherein said second drive surface includes a second plurality of ribs disposed between said third side and said fourth side, and wherein said second drive member comprises a material having a hardness of between about 25 Shore A and about 95 Shore A;

wherein said first rotatable shaft is disposed adjacent said cartridge magazine such that one or more of said first plurality of ribs intermeshes with one or more of said first plurality of grooves, such that said housing is moved into said cartridge magazine when said first rotatable shaft is rotated in a first direction and out of said cartridge magazine when said first rotatable shaft is rotated in a second direction; and wherein said second rotatable shaft is disposed adjacent said cartridge magazine such that one or more of said second plurality of ribs intermeshes with one or more of said second plurality of grooves, such that said housing is moved into said cartridge magazine when said second rotatable shaft is rotated in said second direction and out of said cartridge magazine when said second rotatable shaft is rotated in said first direction.

20. A method to move a portable information storage medium, comprising the steps of:

disposing said information storage medium in a housing comprising:

a first surface having a first width, a first edge, and an opposing second edge;

a second surface having a second width, a third edge, an opposing fourth edge, wherein said third edge is attached to said first edge, and wherein said second surface includes a first plurality of grooves disposed between said third edge and said fourth edge;

a third surface having a third width, a fifth edge, and an opposing sixth edge, wherein said fifth edge is attached to said second edge;

wherein said second width is substantially equal to said third width, and wherein said fourth edge and said sixth edge are separated by a first distance, wherein said first distance is greater than said first width;

moveably disposing said housing in an apparatus comprising:

a first rotatable shaft;

a first drive member disposed around said first rotatable shaft, wherein said drive member comprises a first side having a first diameter, an opposing second side having a second diameter, and a first drive surface connecting said first side and said second side, wherein said first diameter is greater than said second diameter, and wherein said first drive surface includes a first plurality of ribs disposed between said first side and said second side;

intermeshing said first plurality of ribs with said first plurality of grooves; and rotating said first rotatable shaft.

21. The method of claim 20 further comprising the step of positioning said housing adjacent said first rotatable shaft such that said first drive member contacts said second surface.

22. The method of claim 21, wherein said first drive member comprises an elastomer.

23. The method of claim 22, wherein said first drive member has a hardness of between about 25 Shore A and about 95 Shore A.

24. The method of claim 20, further comprising the steps of:

rotating said first rotatable shaft in a first direction; and moving said housing in a second direction.

25. The method of claim 24, further comprising the steps of:

rotating said first rotatable shaft in a third direction; and moving said housing in a fourth direction.

26. The method of claim 20, wherein said apparatus further comprises:

a second rotatable shaft;

a second drive member disposed around said second rotatable shaft, wherein said second drive member comprises a third side having a third diameter, an opposing fourth side having a fourth diameter, and a second drive surface connecting said third side and said fourth side, wherein said third diameter is greater than said fourth diameter, and wherein said second drive surface includes a second plurality of ribs disposed between said third side and said fourth side;

wherein said third surface includes a second plurality of grooves disposed between said fifth edge and said sixth edge;

said method further comprising the steps of:

intermeshing said second plurality of ribs with said second plurality of grooves; and rotating said second rotatable shaft.

27. The method of claim 26, wherein said second drive member comprises an elastomer.

28. The method of claim 27, wherein said second drive member has a hardness of between about 25 Shore A and about 95 Shore A.

29. The method of claim 26, further comprising the steps of:

rotating said first rotatable shaft in a first direction;

rotating said second rotatable shaft in a second and moving said housing in a third direction.

30. The method of claim 29, further comprising the steps of:

rotating said first rotatable shaft in said second direction;

rotating said second rotatable shaft in said first direction; and moving said housing in a fourth direction.

* * * * *